(12) United States Patent
Goldenberg et al.

(10) Patent No.: US 8,360,178 B2
(45) Date of Patent: Jan. 29, 2013

(54) MOBILE ROBOT

(75) Inventors: Andrew A. Goldenberg, Toronto (CA); Jun Lin, Toronto (CA)

(73) Assignee: Engineering Services Inc., Toronto, ON (CA)

( * ) Notice: Subject to any disclaimer, the term of this patent is extended or adjusted under 35 U.S.C. 154(b) by 0 days.

(21) Appl. No.: 13/007,298

(22) Filed: Jan. 14, 2011

(65) Prior Publication Data

US 2011/0168460 A1 Jul. 14, 2011

Related U.S. Application Data

(60) Provisional application No. 61/295,113, filed on Jan. 14, 2010.

(51) Int. Cl.
*B62D 55/075* (2006.01)

(52) U.S. Cl. ........ 180/9.1; 180/9.32; 180/9.4; 180/9.62; 180/65.8; 280/5.24; 280/5.22; 280/5.3; 901/1; 901/47

(58) Field of Classification Search ............ 180/9.1, 180/9.32, 9.4, 9.62, 65.8; 280/5.24, 5.22, 280/5.3; 901/1, 47

See application file for complete search history.

(56) References Cited

U.S. PATENT DOCUMENTS

| | | | | |
|---|---|---|---|---|
| 4,932,831 A * | 6/1990 | White et al. | | 414/732 |
| 5,413,454 A * | 5/1995 | Movsesian | | 414/729 |
| 5,451,135 A * | 9/1995 | Schempf et al. | | 414/694 |
| 5,550,953 A * | 8/1996 | Seraji | | 700/263 |
| 6,263,989 B1 | 7/2001 | Won | | |
| 7,348,747 B1 | 3/2008 | Theobold et al. | | |
| 7,493,976 B2 | 2/2009 | Goldenberg et al. | | |
| 7,600,592 B2 | 10/2009 | Goldenberg et al. | | |
| 7,654,348 B2 * | 2/2010 | Ohm et al. | | 180/9.32 |
| 7,784,570 B2 * | 8/2010 | Couture et al. | | 180/9.1 |
| 7,874,386 B2 * | 1/2011 | Ben-Tzvi et al. | | 180/9.1 |
| 7,891,446 B2 * | 2/2011 | Couture et al. | | 180/9.32 |
| 8,108,092 B2 * | 1/2012 | Phillips et al. | | 701/23 |
| 2007/0209844 A1 * | 9/2007 | Kamimura | | 180/9.32 |
| 2008/0184840 A1 | 8/2008 | Novoplanski et al. | | |
| 2008/0277172 A1 | 11/2008 | Ben-Tzvi et al. | | |
| 2008/0296853 A1 | 12/2008 | Langford et al. | | |
| 2011/0040427 A1 * | 2/2011 | Ben-Tzvi | | 701/2 |

FOREIGN PATENT DOCUMENTS

JP 2005111595 4/2005

OTHER PUBLICATIONS

International Search Report (PCT/CA2011/050018) completion date; Apr. 20, 2011.

* cited by examiner

*Primary Examiner* — Tashiana Adams
*Assistant Examiner* — Marlon Arce
(74) *Attorney, Agent, or Firm* — Hill & Schumacher

(57) ABSTRACT

The mobile robot includes a chassis, a pair of drive system, a manipulator arm with a turret. The pair of drive systems is operably connected to opposed sides of the chassis. The turret is rotationally attached to the platform. The first link of the manipulator arm is attached to the turret at a first joint. The manipulator arm has at least a first link, and the first link is adapted to function as a traction device.

20 Claims, 19 Drawing Sheets

MOBILE ROBOT

CROSS REFERENCE TO RELATED PATENT APPLICATION

This patent application relates to U.S. Provisional Patent Application Ser. No. 61/295,113 filed on Jan. 14, 2010 entitled MOBILE ROBOT which is incorporated herein by reference in its entirety.

FIELD OF THE INVENTION

This invention relates to mobile robots and in particular to mobile robots that includes a linkage mechanism with a dual function.

BACKGROUND OF THE INVENTION

The present invention relates to mobile robots. Mobile robots are typically designed to be either remotely controlled or are autonomous. One of the big challenges in regard to mobile robots is manoeuvring them up and down stairs, over obstacles and uneven terrains.

It is known to those skilled in the art that by extending the wheel base or track base the ability of the mobile robot to manoeuvre stairs and overcome obstacles can be enhanced. There have been some devices that have been suggested which attempt to extend the wheel or track base. Specifically, United States published patent application U.S.20080277172A1, published Nov. 13, 2008 to Ben-Tzi et al. shows a mobile robot wherein the first link has the function of acting as a first link of an arm as well as a chassis with tracks on each side, and the second link may be deployed from one end thereof so as to extend the track base. The second link is pivotally attached to first link. Alternatively United States published patent application U.S.20080296853A1 published Dec. 4, 2008 to Langord et al. shows a platform-mounted manipulator arm with a ski attached to a first link to assist in stair climbing. The first link is pivotally attached to the chassis. As well, the PackBot™ mobile robot has a pair of tracked flippers pivotally attached to either side of the chassis at one end thereof. The PackBot™ is shown in U.S. Pat. No. 6,263,989 issued Jul. 24, 2001 to Won and related patents. Another alternative was shown in U.S. Pat. No. 7,493,976 issued Feb. 24, 2009 and U.S. Pat. No. 7,600,592 issued Oct. 13, 2009 to Goldenberg et al. those show a right and left planetary wheel which may be used to extend the track base.

With regard to all of these prior art mobile robots their versatility is limited because the first link is pivotally attached to the platform or chassis with only one degree of freedom. Accordingly the range of motion is limited and the flexibility in the utility of the first link is limited. Further, particularly in regard to U.S. Pat. No. 6,263,989 and U.S. Pat. No. 7,600,592 the tracked flipper and the planetary wheel are single purpose devices. As well, both the US patent applications U.S.20080277172A1 and U.S.20080296853A1 use sliding friction between the first arm/link and stairs to improve mobility. However, this sliding friction will cause a reduced working efficiency and possible failure due to the arm/link wear-out. U.S.20080296853A1 attaches a ski structure on the underside of the first link of the arm in an attempt to reduce the friction.

Accordingly the present invention would be advantageous to provide a mobile robot with a dual purpose manipulation arm that is attached to the chassis of the robot by way of a turret. Thereby the manipulation arm may be deployed to the sides of the robot as well to the front and the back. As well, the manipulator arm is adapted to be used to increase the wheel or track base, as well as for other functions. The mobile robot of the present invention has the ability to lift its front pulleys or wheels forward and upward thus increasing it ability to ascend and descend stairs and to manoeuvring around obstacles. As well, the mobile robot of the present invention can adjust the position of its centre of gravity to protect it turning over while ascending and descending stairs and manoeuvring around obstacles.

SUMMARY OF THE INVENTION

The present invention relates to a mobile robot including a chassis, a pair of drive systems, a manipulator arm with a turret. The pair of drive systems are operably connected to opposed sides of the chassis. The turret is rotationally attached to the chassis. The first link of the manipulator arm is attached to the turret at a first joint. The manipulator arm has at least a first link, and the first link is adapted to function as a traction device.

The first link may include a flipper track whereby the flipper track functions as the traction device.

The first link is generally triangular in shape and the flipper track is positioned along one side of the triangle and the first link can be positioned such that the flipper track extends outwardly from the chassis.

The drive system may be one of a track drive system and a wheel drive system.

The drive system may be changeable between a track drive system and a wheel drive system.

The chassis may include four universal shafts and the drive system may be operably connected to the universal shafts.

Quick release pins may operably attached the drive system to the universal shafts.

The chassis may have a knee hole cut out one either side thereof between the pair of drive systems whereby the first link can be deployed between pair of drive systems.

A portion of the first link may be positionable as an extension of the pair of drive systems.

The manipulator arm may include a second link pivotally attached to the first link and a gripper operably attached to the second link.

The turret may rotate continuously.

The robot is adapted to surmount obstacles and climb stairs and whereby the first link of the manipulator arm helps to surmount obstacles and climb the stairs by lifting the front of the chassis forward and upward.

The robot may be operated remotely by an operator or autonomously.

Further features of the invention will be described or will become apparent in the course of the following detailed description.

BRIEF DESCRIPTION OF THE DRAWINGS

The invention will now be described by way of example only, with reference to the accompanying drawings, in which.

DETAILED DESCRIPTION OF THE INVENTION

Figure 1:
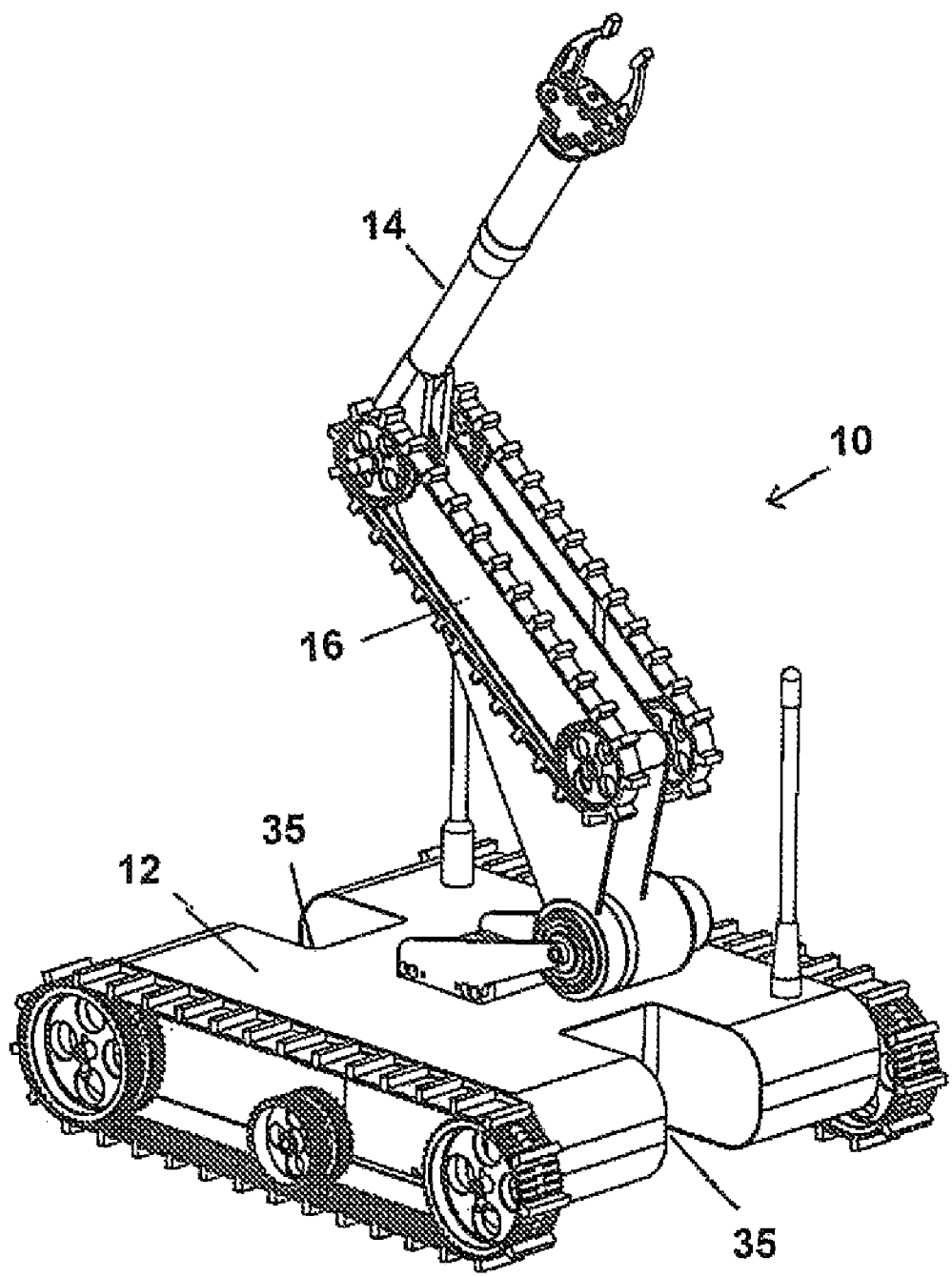
FIG. 1 is a perspective view of an embodiment of a mobile robot of the present invention.

Referring to FIG. 1, the mobile robot 10 is a novel mobile robot that has been designed based on the combination of a mobile platform 12 and a manipulation arm 14. The core concept is that the first link or shoulder link 16 of the manipulator arm is not only a part of the arm, but also it can be used as an aid in mobility of the platform to enhance the robot's capability in regard to climbing stairs and overcoming obstacles.

FIG. 2(a) to (h) shows how the first link 16 of the mobile robot 10 may be used to aid in climbing stairs. FIG. 3(a) to (h) shows how the first link 16 of the mobile robot 10 may be used to crossing ditches.

Referring to FIGS. 4 to 7, the platform 12 has a chassis or frame 18. A pair of drive systems is attached opposed sides of the chassis 18. In one embodiment the drive systems are track and pulley systems that are attached to each side of the chassis 18. Each track 20 and pulley system includes a track 20, a pair of drive pulleys 22 at either end of the chassis 18 and a sub pulley 24 intermediated of the drive pulleys 22. Each track 20 engages the respective drive pulleys 22 and sub pulley 24. Each track and pulley system is operably connected to the transmission system 26. In order to reduce the likelihood of the track coming off from pulleys, preferably the track includes a guide that engages the pulley with self-tracking groove. An E-box or electronics box 28 and a C-box or control box 30 is located in the chassis 18. Preferably the E-box 28 consists of two guitar drives for traction motors, six whistle drives for manipulator motors and a distribution board. Preferably C-box 30 includes a Cancard & Athena II (PC-104), Data Modem, VT30 video transmitter, VR75 video receiver and Quad. Batteries 32 are operably connected to the other systems to power and control the robot. Other accessories may also be included as needed by the user. As well, various antennae 34 may also be included.

The chassis 18 has knee holes 35 cut out on each side thereof. The knee holes 35 are dimensioned to accommodate first link 16 of the manipulator arm 14 when it is being deployed for locomotion. Preferably the first link can be deployed such that a portion of the first link act as an extension of the pair of drive systems.

Figure 7:
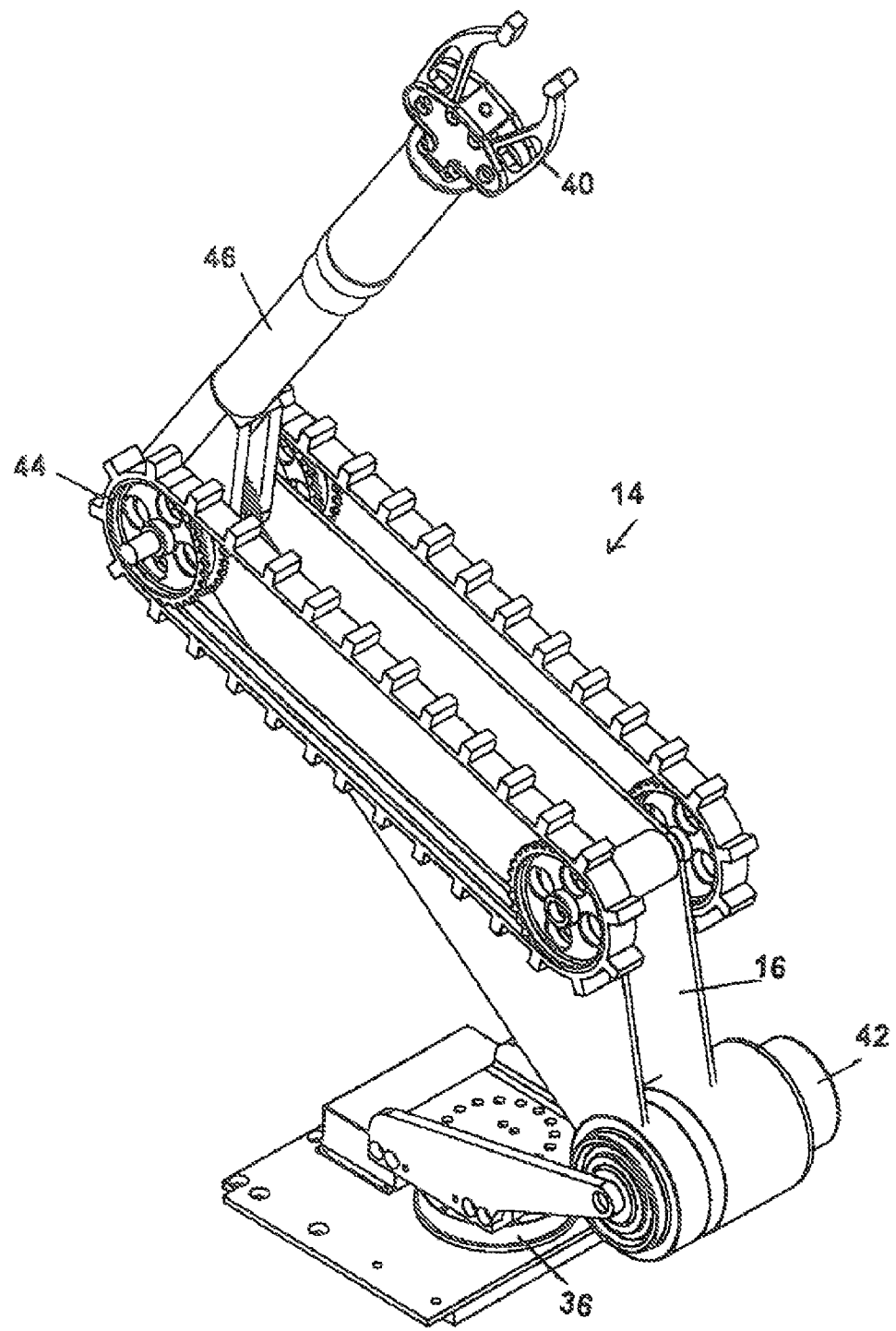
FIG. 7 is a perspective view of the manipulator arm of an embodiment of the mobile robot of the present invention.

The manipulator arm 14 includes a turret 36, a first or shoulder link 16, a second or elbow link 46, and a gripper and roll 40, as shown in FIG. 7. The shoulder link 16 has a shoulder joint 42 pivotally connecting it to the turret 36 at one end thereof and an elbow joint 44 pivotally connecting it to a second or elbow link 46. The second link 46 has the gripper and roll 40 at the distal end thereof.

Figure 8:
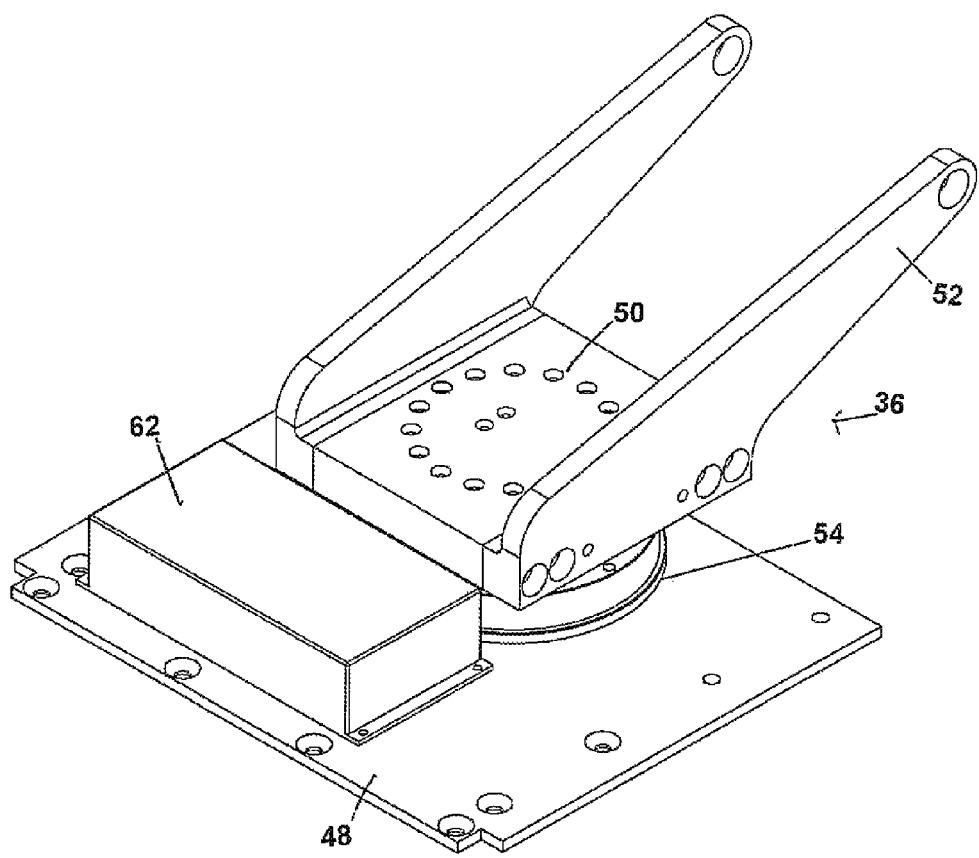
FIG. 8 is a perspective view of the turret of the manipulator arm of FIG. 7.
Figure 9:
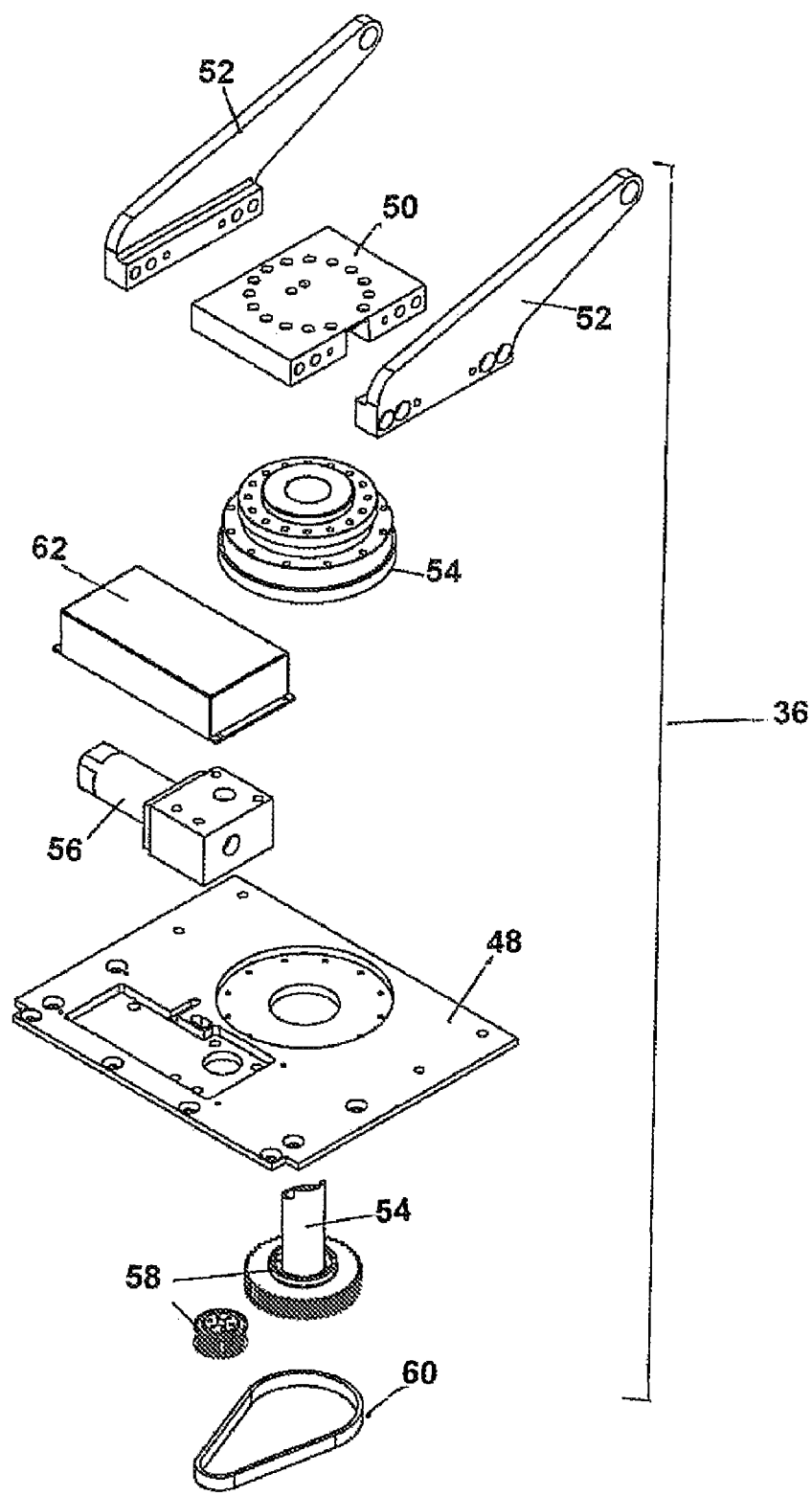
FIG. 9 is a blown apart perspective view of the turret of FIG. 8.

Referring to FIGS. 8 and 9, turret 36 includes a turret support 48, a turret base bottom 50, rotationally attached to the turret support 48 and turret sides 52 attached to the turret base bottom 50. Preferably the turret support can rotate continuously. Turret base bottom 50 is pivotally attached to the turret support 48 through a harmonic drive 54. A gear box 56 is operably connected to the harmonic drive with timing pulleys 58 and timing belt 60. A gear box housing 62 covers gear box 56 and is attached to turret support 48.

Figure 10:
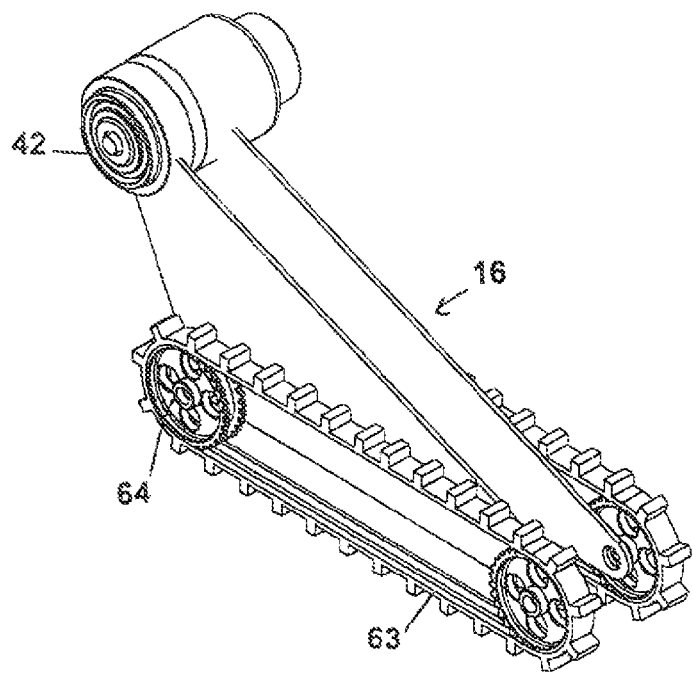
FIG. 10 is a perspective view of the first link of the manipulator arm of FIG. 7.

Referring to FIG. 10, the shoulder link 16 includes a flipper track 63 operably connected to flipper pulleys 64 and a shoulder joint 42. Shoulder link 16 is preferably triangular in shape such that it can be deployed so that the flipper track 63 may generally be in the same plane as the tracks 20. Shoulder joint 42 pivotally connects the shoulder link 16 to the turret 36

Figure 11:
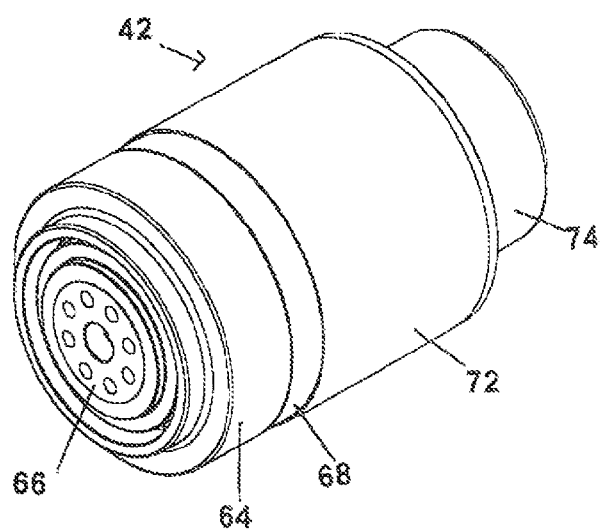
FIG. 11 is a perspective view of the shoulder joint of the first link shown in FIG. 10.
Figure 12:
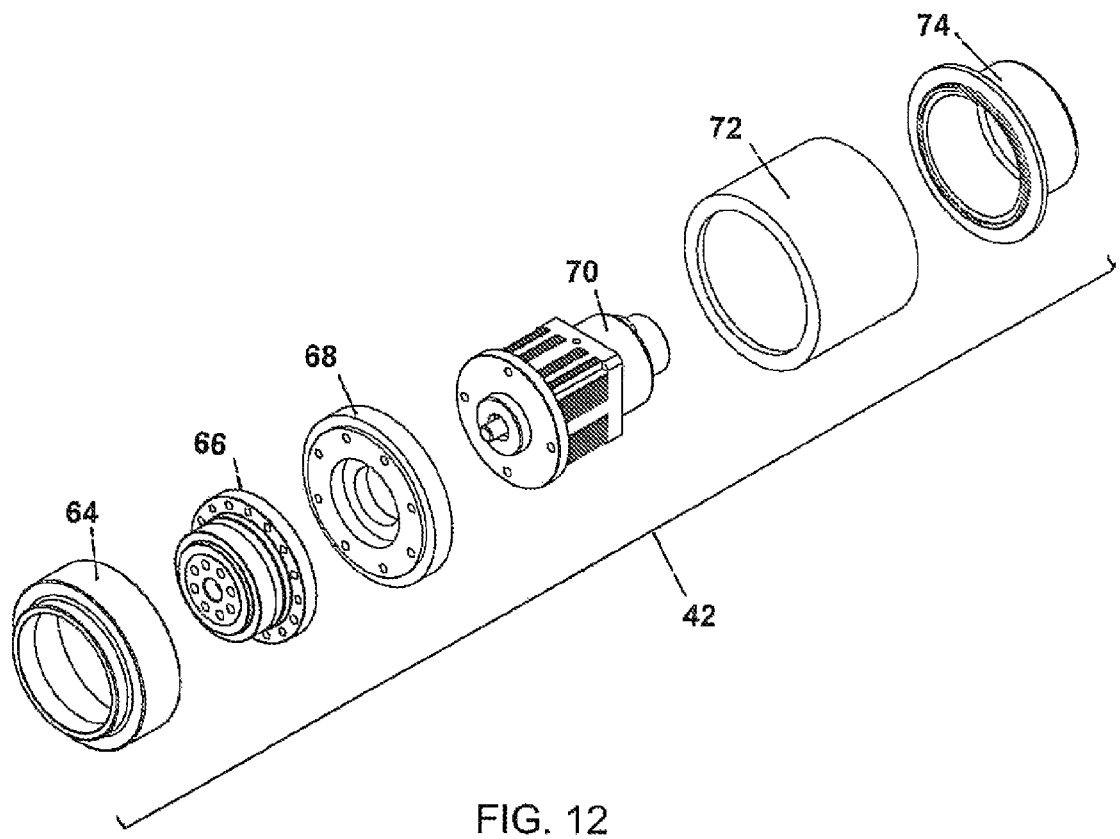
FIG. 12 is a blown apart perspective view of the shoulder joint of FIG. 11.

Referring to FIGS. 11 and 12 shoulder joint 42 includes a housing up 64, a harmonic drive 66, a housing base 68, a transmission system 70, a housing 72 and a housing down 74. The harmonic drive 66 and the transmission system are operably connected together and are housed within the combined housing 72, housing base 68, housing up 64 and housing down 74.

Figure 13:
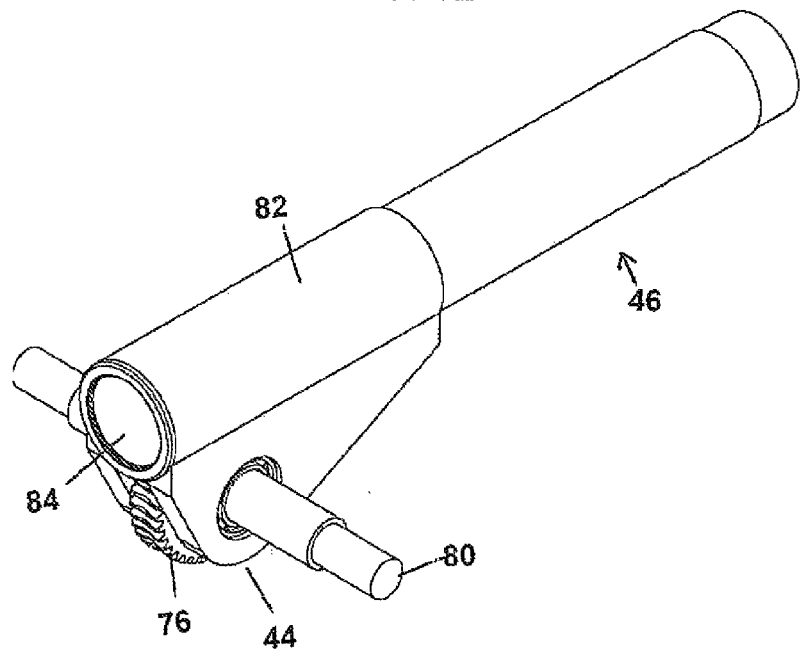
FIG. 13 is a perspective view of the elbow joint of the manipulator arm of FIG. 7.
Figure 14:
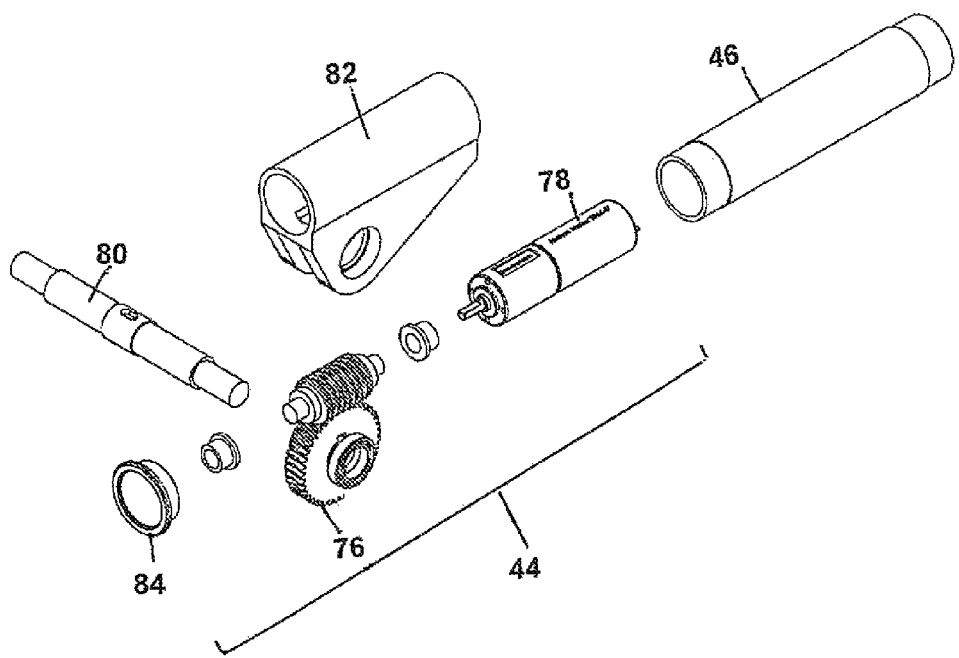
FIG. 14 is a blown apart perspective view of the elbow joint of FIG. 13.

The elbow 44 connects the shoulder link 16 to the elbow link 46. Referring to FIGS. 13 and 14, the elbow 44 includes a worm and worm gear 76 operably connected to an elbow transmission system 78. A shaft 80 is operably connected to the worm and worm gear 76. An elbow housing 82 and elbow insert 84 together with elbow link 46 combine to create a housing for the worm and worm gear 76 and the transmission system 78. The shaft 80 is co-axial with one of the flipper pulleys 64.

Figure 15:
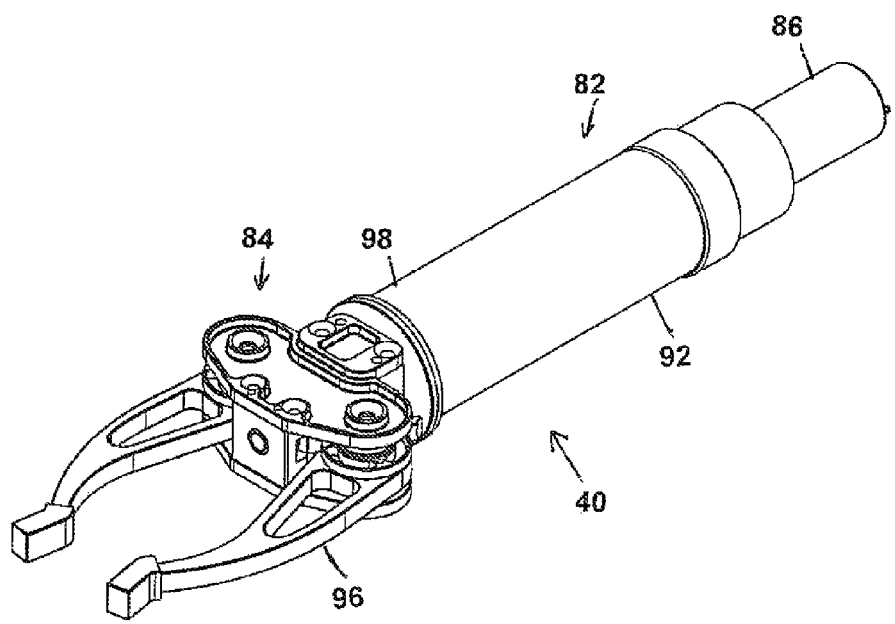
FIG. 15 is a perspective view of the gripper and roll joint of the manipulator arm of FIG. 7.
Figure 16:
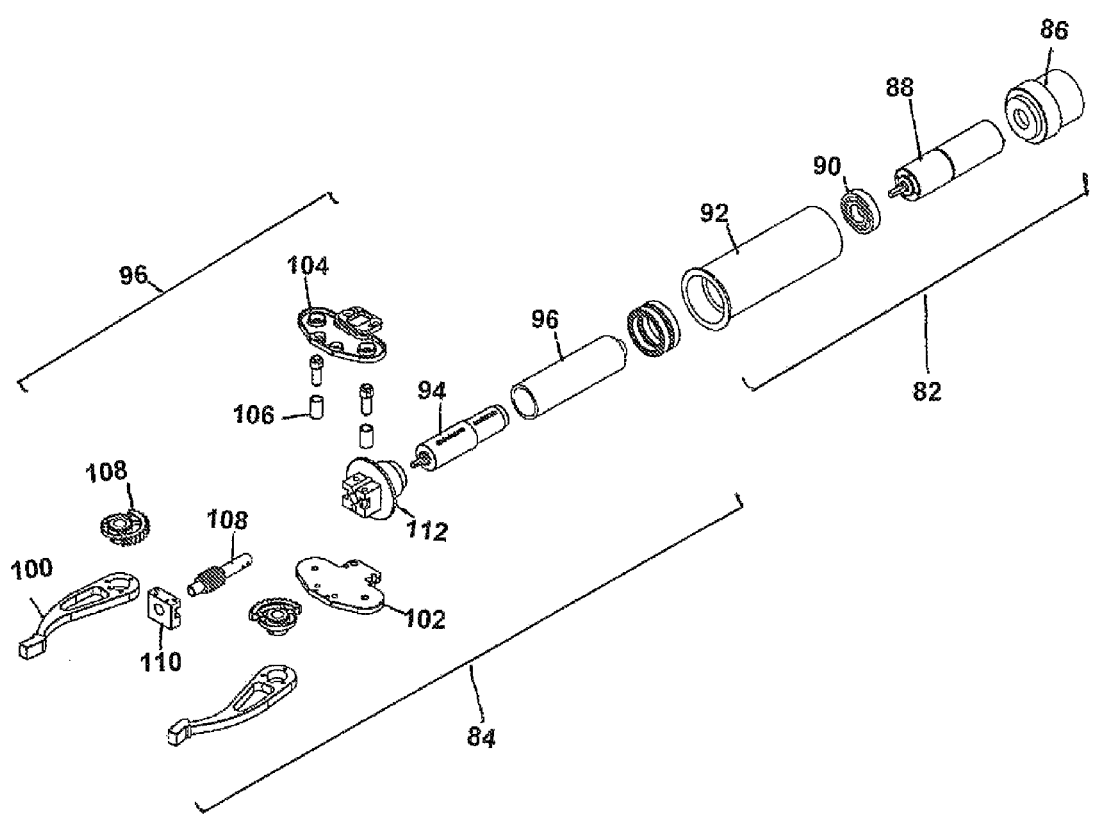
FIG. 16 is a blown apart perspective view of the gripper and roll joint of FIG. 15.

Referring to FIGS. 15 and 16 the gripper and roll 40 includes gripper portion 82 and a roll portion 84. The roll portion 84 includes a connector 86 which is adapted to be connected to the elbow link 46. A roll transmission 88 and a roll ball bearing 90 are housed within the roll housing 92. A gripper transmission 94 is housed within a gripper housing 96. The gripper housing 96 is engages the roll ball bearing 90. The gripper transmission 94 is operably connected to the gripper finger system 96. The gripper ball bearing 98 engages the roll housing 92 and the gripper finger system 96. The gripper finger system 96 includes fingers 100, pivotally attached between a top plate 102 and a bottom plate 104 with pivots 106. Worm gears 108 are operably connected between the fingers 100 and the gripper transmission 94. A front block 110 and a back block 112 are connected to the top 102 and bottom 104 plates.

Figure 17:
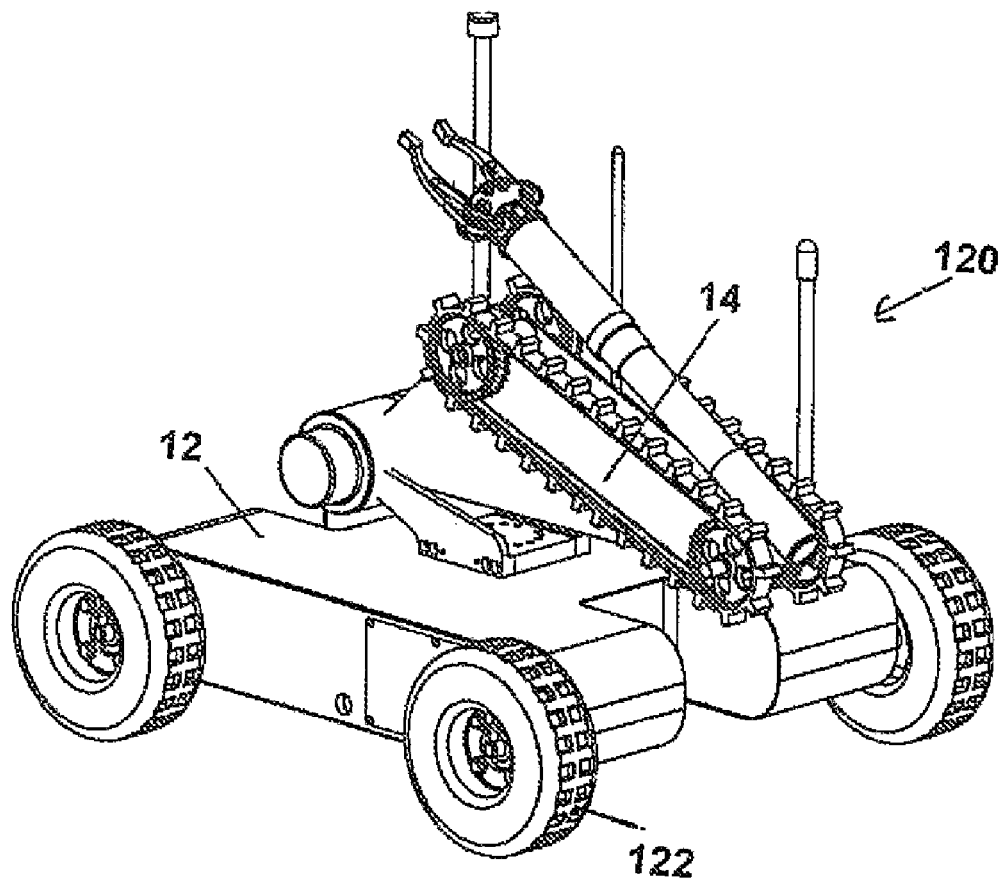
FIG. 17 is a perspective view of an alternate of a mobile robot of the present invention similar to that shown in FIG. 1 but including wheels instead of tracks.
Figure 18:
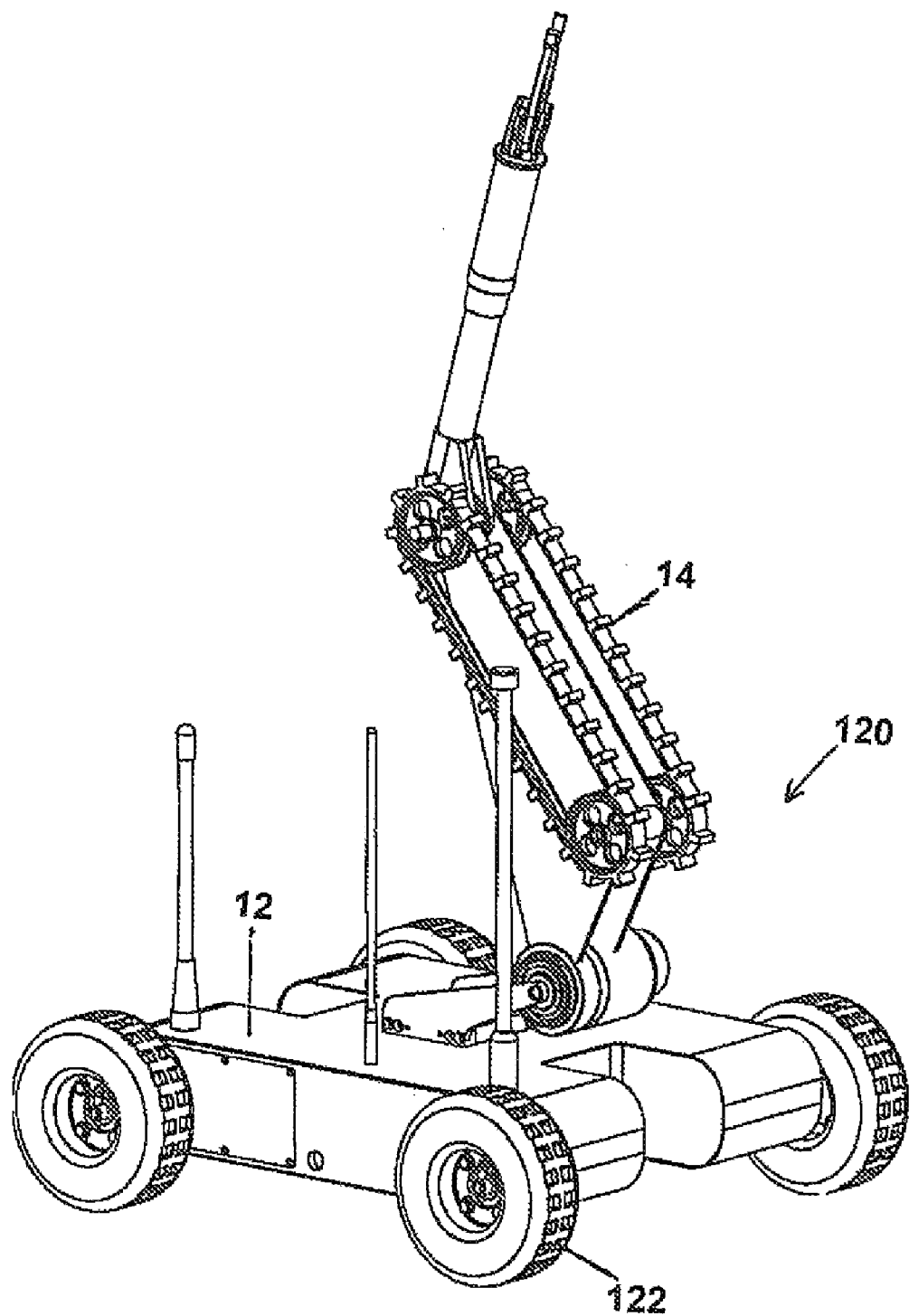
FIG. 18 is a perspective view of the hybrid mobile robot of FIG. 17 showing the manipulation arm in a deployed position.
Figure 19:
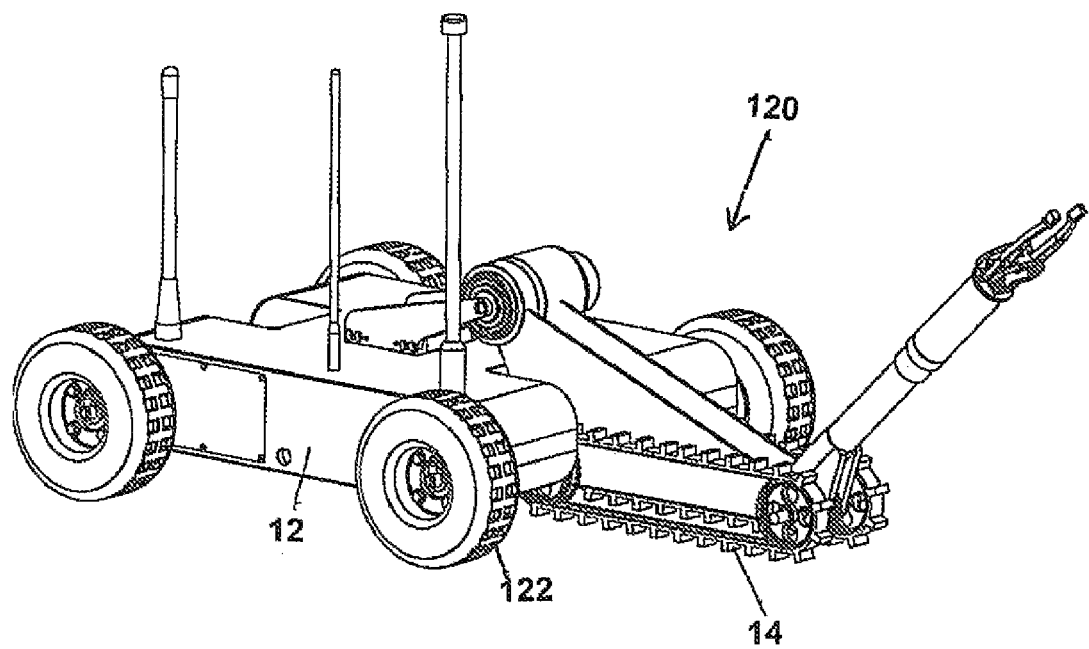
FIG. 19 is a perspective view of the hybrid mobile robot of FIGS. 17 and 18 showing first link of the manipulation arm in the traction position.

Referring to FIGS. 17 to 19 it will be appreciated by those skilled in the art that the manipulator arm 14 of the present invention may also be used with wheeled mobile robots as shown generally at 120. The wheeled mobile robot 120 would work much the same way as described above in regard to a tracked mobile robot but it uses wheels 122 rather than tracks. The four wheels 122 are attached to the four corners of the chassis 18 and are operably connected to transmission system 26 (not shown). In generally the wheeled robot operates the same way as the tracked robot. It is well known in the art that wheels are preferred in certain situations and tracks are preferred in other situations.

Figure 20:
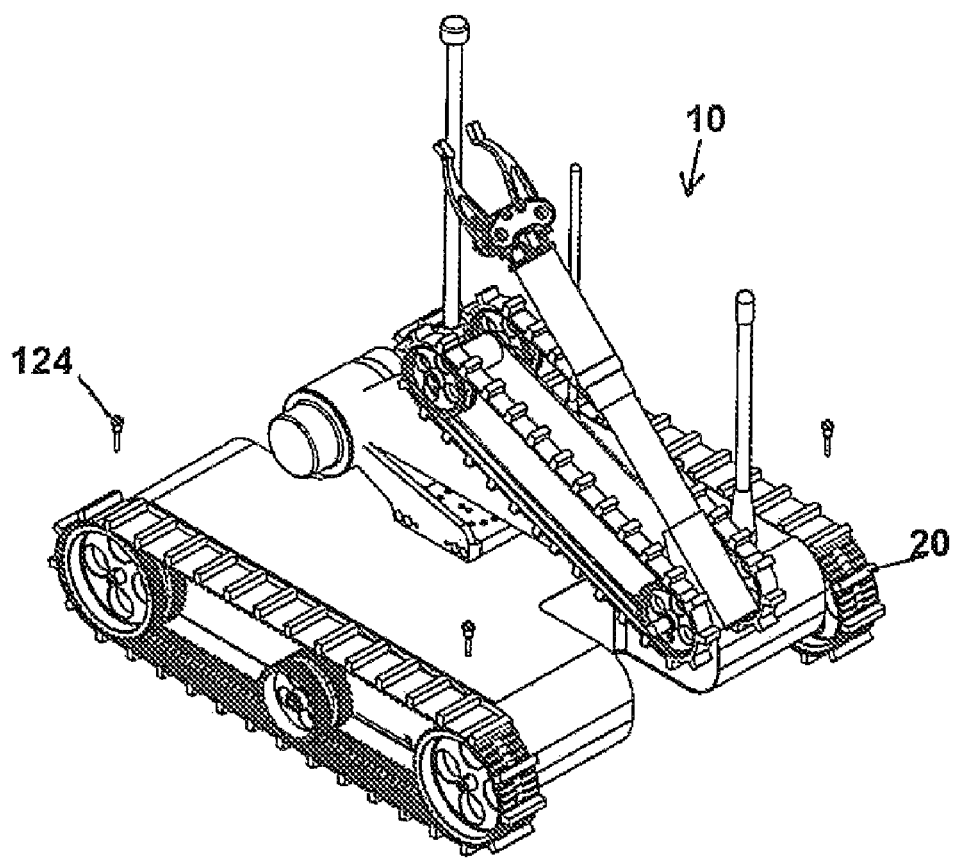
FIG. 20 is a perspective view of the hybrid mobile robot of FIG. 1 and showing the quick release pins removed.
Figure 21:
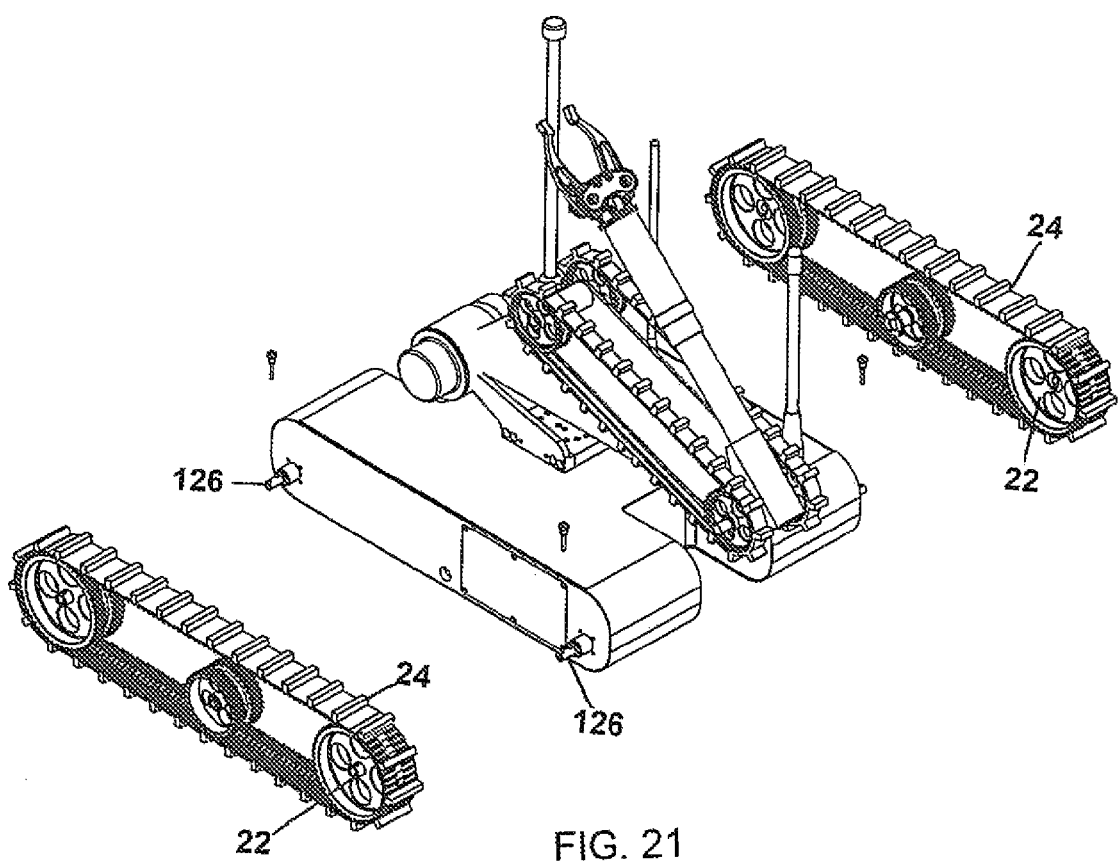
FIG. 21 is a perspective view of the hybrid mobile robot of FIG. 20 and showing the track and pulleys disassembled.
Figure 22:
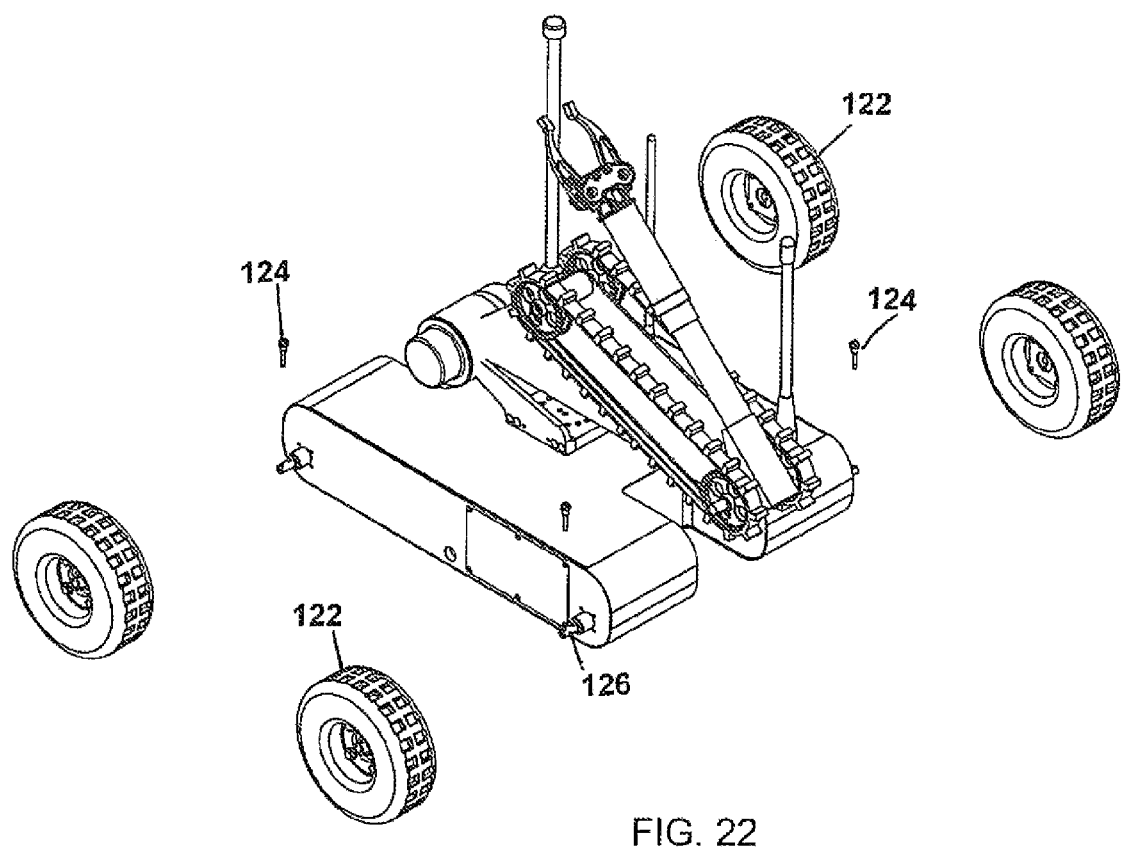
FIG. 22 is a perspective view of the hybrid mobile robot of FIG. 20 and showing wheels positioned to be attached.
Figure 23:
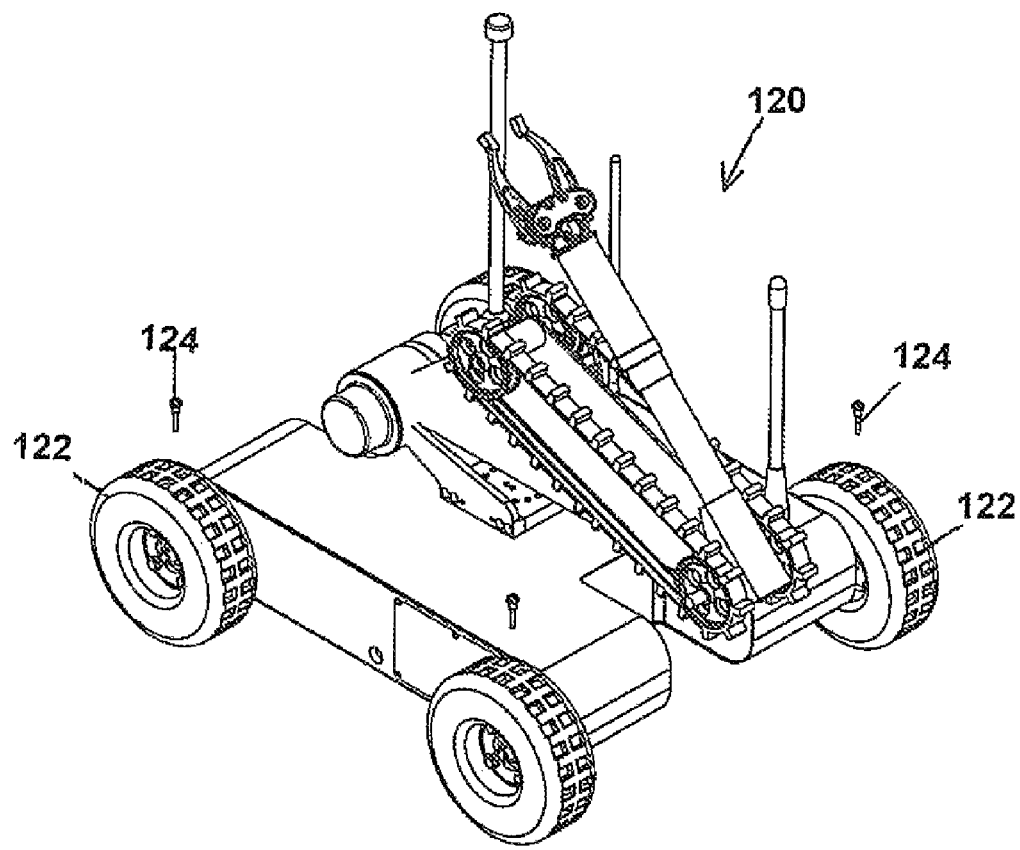
FIG. 23 is a perspective view of the hybrid mobile robot of FIG. 20 and showing the wheels attached with the quick release pins positioned to be attached.

The steps of changing the tracked robot 10 to a wheeled robot 120 are shown in FIGS. 20 to 23. The chassis or frame 18 includes four universal shafts for mounting wheels 122 or track 20 and drive pulleys 22. The wheels or pulleys are connected to shafts 126 by quick-release pins 124. The quick release pins 124 are removed from each shaft as shown in FIG. 20. The tracks and pulleys 22 are removed as shown in FIG. 21. The wheels 122 are positioned with one wheel being attached to each shaft 126 as shown in FIG. 22. The pins 124 are connected to the shafts 126 securing each wheel 124 as shown in FIG. 23. These steps can be reversed to change the robot from a wheeled robot 120 back to a tracked robot 10. It will be appreciated by those skilled in the art that this switch may be done as quickly as five minutes.

Figure 2:
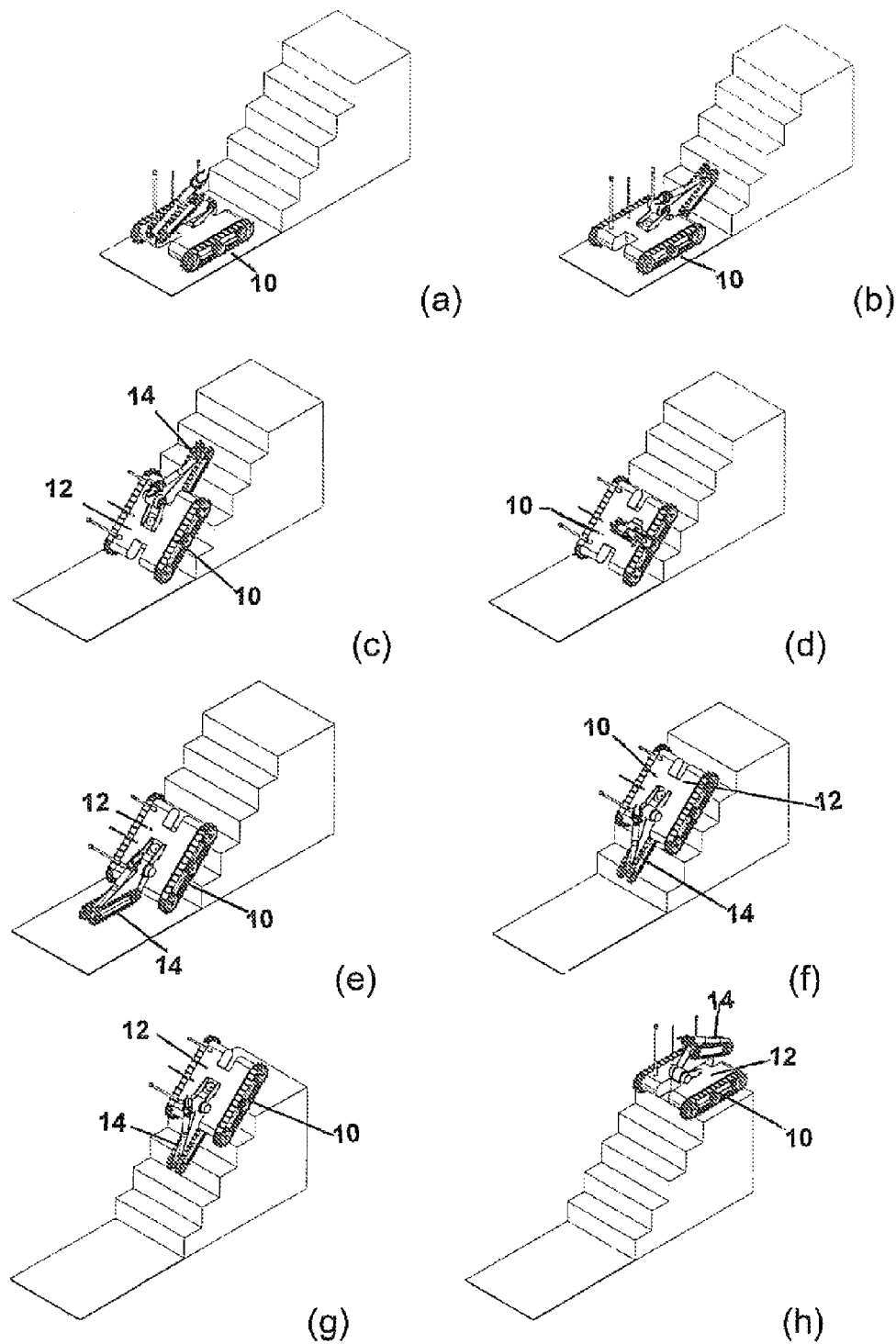
FIG. 2(a) to (h) is a series of perspective views of an embodiment of the mobile robot of the present invention illustrating the steps of climbing stairs.
Figure 3:
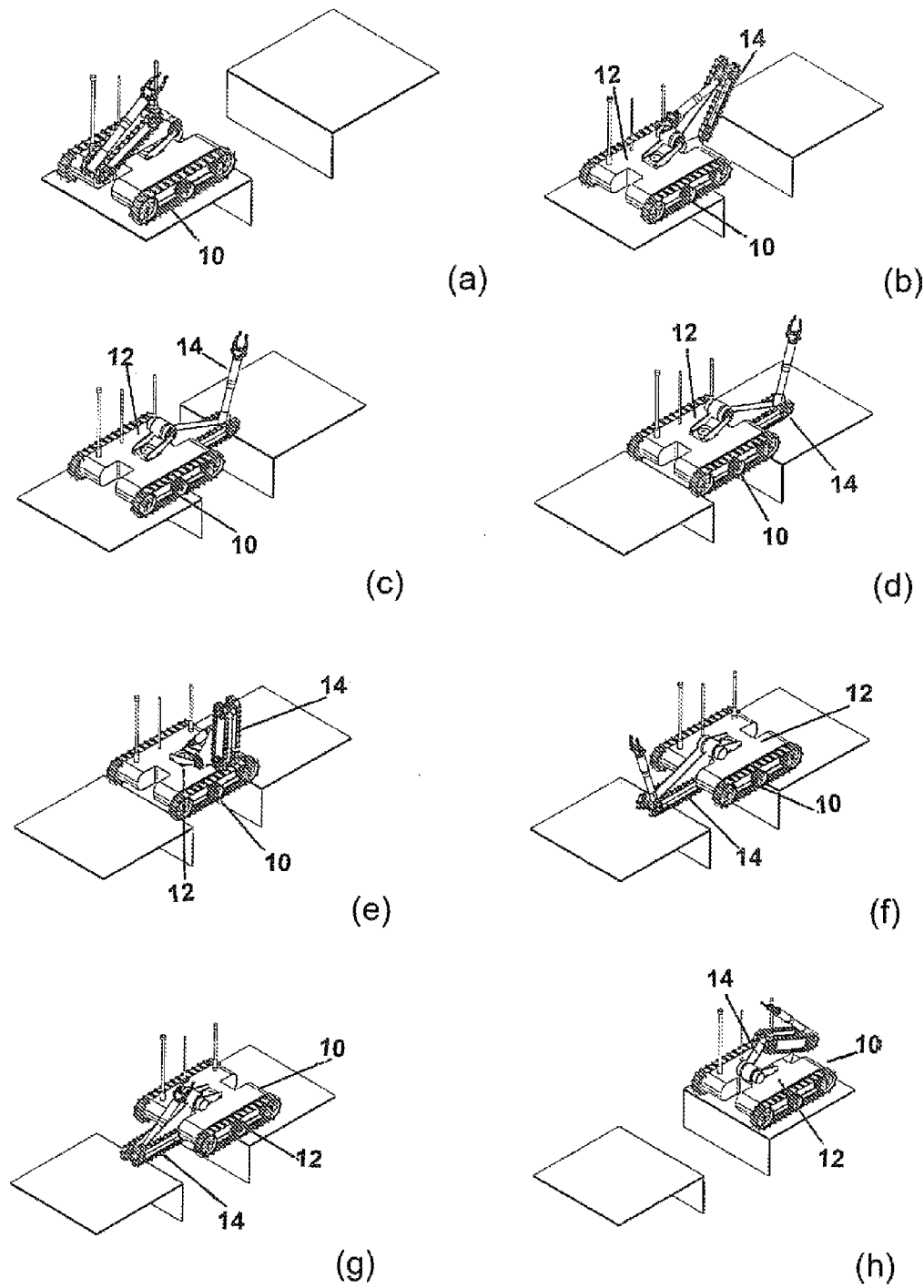
FIG. 3(a) to (h) is a series of perspective views of an embodiment of the mobile robot of the present invention illustrating the steps of cross a ditch.
Figure 4:
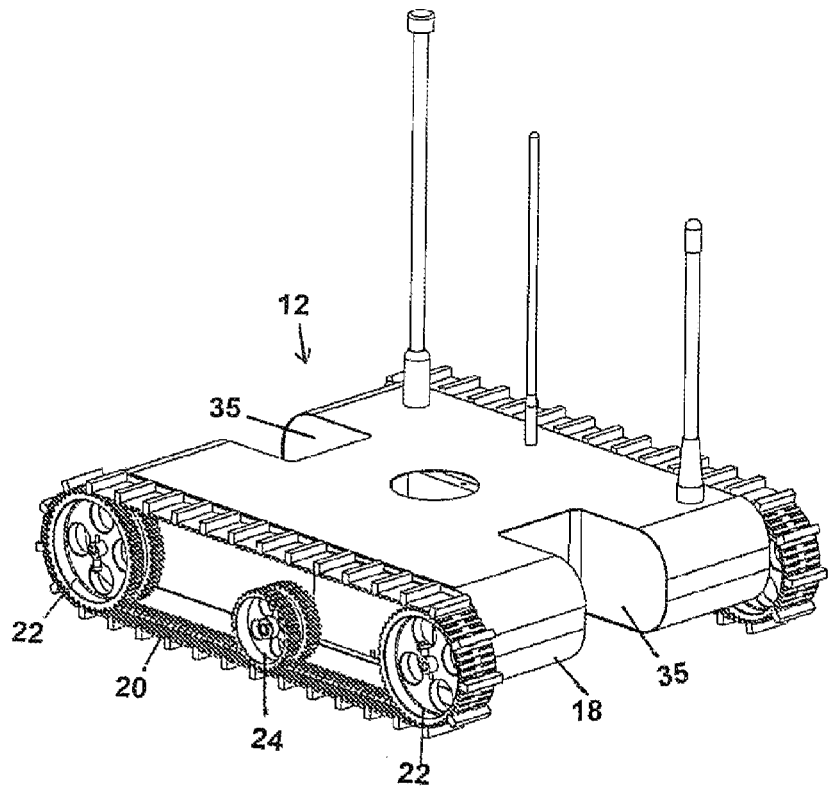
FIG. 4 is a perspective view of the platform of an embodiment of the mobile robot.
Figure 5:
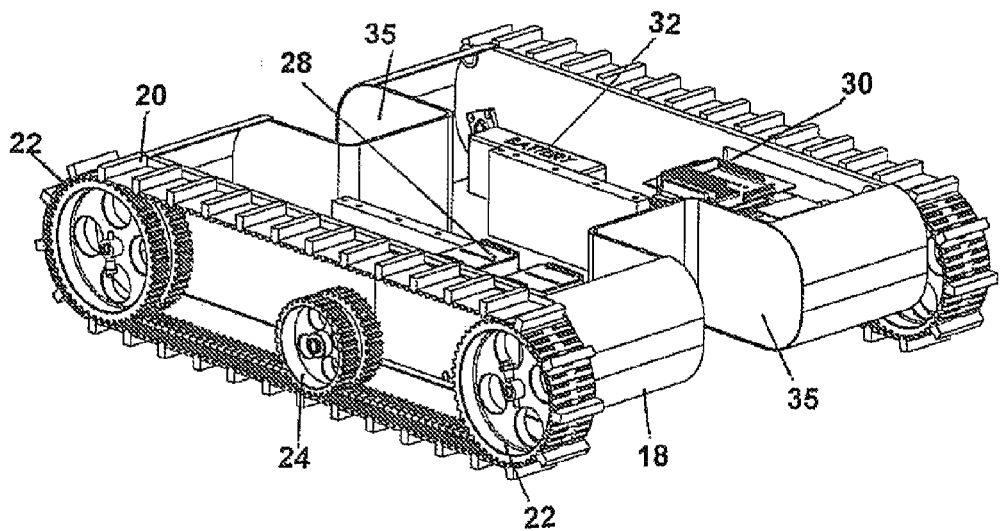
FIG. 5 is a perspective view of the platform similar to that shown in FIG. 4 but showing the cover removed.
Figure 6:
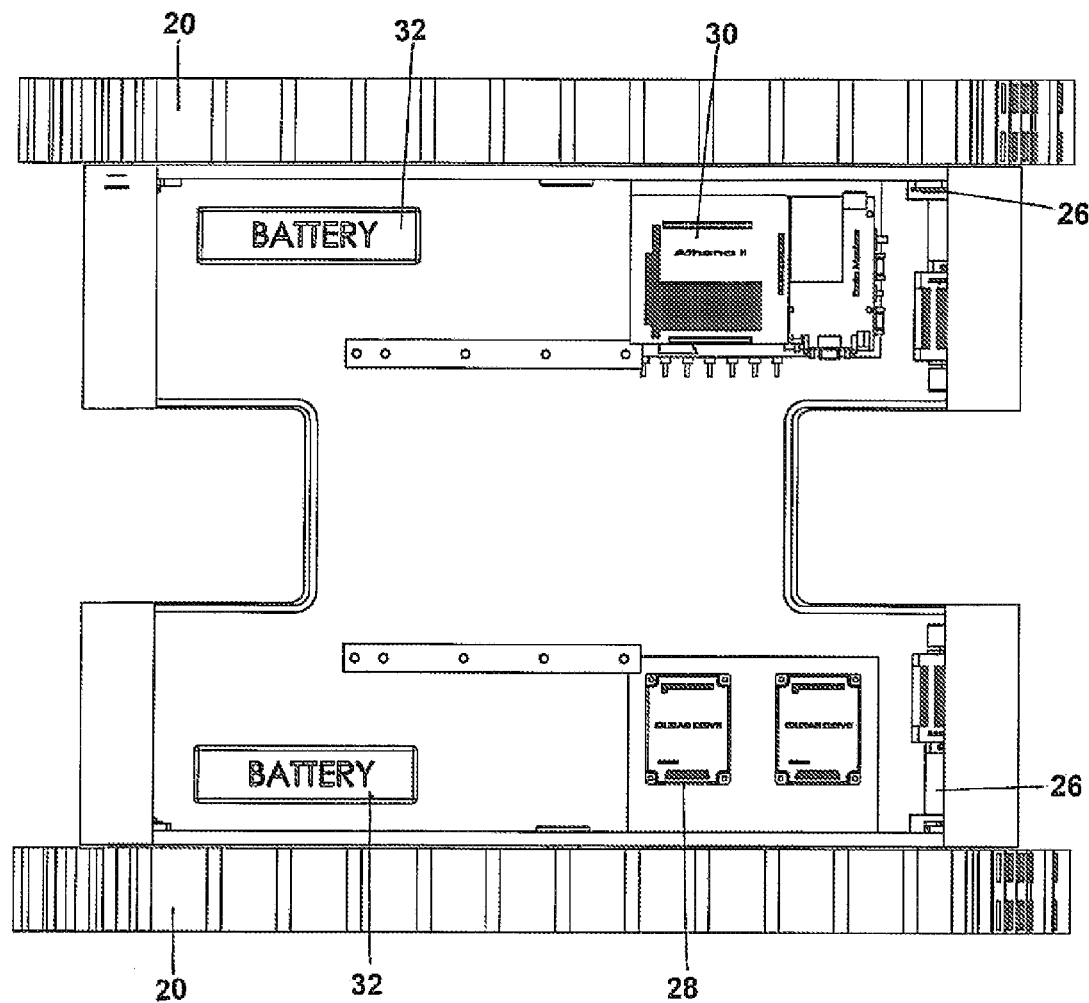
FIG. 6 is a top view of the platform of an embodiment of the mobile robot.

In use as shown in FIGS. 2 and 3 the manipulator arm 14 can be used to extend the wheel or track base. As shown in FIG. 2 when the mobile robot 10 approaches stairs the manipulator arm 14 may be deployed such that the tracked first link engages the stairs (b). The tracked first link aids in the stair climbing by lifting the platform. The mobile robot 10 moves up the stairs (c) until the tracks of the robot are engaging the stairs. The manipulator arm 14 is then rotated and pivoted (d) from front end to rear end and then deployed so as to engage the floor below the stair (e). The manipulator arm 14 then aids in pushing the mobile robot 10 up the stairs (f). Once the mobile robot 10 is at the top of the stairs the hybrid manipulator arm 14 can then be put in the stowed position (h). As the angle of the chassis varies the angle of the manipulator arm 14 and in particular the angle of the first link 16 may vary relative to the chassis. Preferably the shoulder joint 42 rotates 210 degrees and the elbow joint 44 rotates 300 degrees.

The steps for moving the mobile robot 10 over a ditch or other obstacle are shown in FIG. 3. The steps are similar to those described above with regard to stairs wherein the first link 16 of the manipulator arm 14 is strategically deployed to extend the track base or wheel base when needed. As shown in FIGS. 3(b) and (f) it can be deployed either in front of or behind the mobile robot.

It will be appreciated by those skilled in the art that the mobile robot of the present invention may be operated remotely or autonomously.

Generally speaking, the systems described herein are directed to mobile robots. As required, embodiments of the present invention are disclosed herein. However, the disclosed embodiments are merely exemplary, and it should be understood that the invention may be embodied in many various and alternative forms. The Figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention. For purposes of teaching and not limitation, the illustrated embodiments are directed to mobile robots.

As used herein, the terms "comprises" and "comprising" are to be construed as being inclusive and opened rather than exclusive. Specifically, when used in this specification including the claims, the terms "comprises" and "comprising" and variations thereof mean that the specified features, steps or components are included. The terms are not to be interpreted to exclude the presence of other features, steps or components.

What is claimed as the invention is:

1. A mobile robot comprising:
a chassis;
a pair of drive system operably connected to opposed sides of the chassis;
a turret rotationally attached to the chassis; and
a manipulator arm having at least a first link, the first link of the manipulator arm being attached to the turret at a first joint and the first link includes a movable traction device such that the manipulator arm aids in mobility.

2. The mobile robot as claimed in claim 1 wherein the first link includes a flipper track whereby the flipper track functions as the traction device.

3. The mobile robot as claimed in claim 1 wherein the first link is generally triangular in shape and a flipper track is positioned along one side of the triangle and the first link can be positioned such that the flipper track extends outwardly from the chassis.

4. The mobile robot as claimed in claim 1 wherein the drive system is one of a track drive system and a wheel drive system.

5. The mobile robot as claimed in claim 1 wherein the drive system is changeable between a track drive system and a wheel drive system.

6. The mobile robot as claimed in claim 5 wherein the chassis includes four universal shafts and the drive system is operably connected to the universal shafts.

7. The mobile robots as claimed in claim 6 wherein quick release pins operably attach the drive system to the universal shafts.

8. The mobile robot as claimed in claim 1 wherein the chassis has a knee hole cut out on either side thereof between the pair of drive systems whereby the first link can be deployed between pair of drive systems.

9. The mobile robot as claimed in claim 8 wherein a portion of the first link is positionable as an extension of the pair of drive systems.

10. The mobile robot as claimed in claim 2 wherein the manipulator arm further includes a second link pivotally attached to the first link and a gripper operably attached to the second link.

11. The mobile robot as claimed in claim 1 whereby the turret can rotate continuously.

12. The mobile robot as claimed in claim 1 whereby the robot is adapted to surmount obstacles and climb stairs and whereby the first link of the manipulator arm helps to surmount obstacles and climb the stairs by lifting the front of the chassis forward and upward.

13. The mobile robot as claimed in claim 1 whereby the robot is operated one of remotely by an operator and autonomously.

14. The mobile robot as claimed in claim 3 wherein the drive system is changeable between a track drive system and a wheel drive system.

15. The mobile robot as claimed in claim 3 whereby the turret can rotate continuously.

16. The mobile robot as claimed in claim 3 wherein the chassis has a knee hole cut out one either side thereof between the pair of drive systems whereby the first link can be deployed between pair of drive systems.

17. A mobile robot comprising:
   a chassis, wherein the chassis includes four universal shafts;
   a pair of drive system operably connected to the universal shafts on opposed sides of the chassis, wherein the drive system is changeable between a track drive system and a wheel drive system;
   quick release pins operably attaching the drive system to the universal shafts;
   a turret rotationally attached to the chassis; and
   a manipulator arm having at least a first link, the first link of the manipulator arm being attached to the turret at a first joint and the first link being adapted to function as a traction device.

18. The mobile robot as claimed in claim 1 wherein the traction device is operably connected to a transmission system.

19. The mobile robot as claimed in claim 18 wherein the first link includes a flipper track whereby the flipper track functions as the traction device.

20. The mobile robot as claimed in claim 19 wherein the first link is generally triangular in shape and the flipper track is positioned along one side of the triangle and the first link can be positioned such that the flipper track extends outwardly from the chassis.

* * * * *